No. 713,255. Patented Nov. 11, 1902.
F. L. TRAUT.
JOINT FOR FOLDABLE RULES OR SIMILAR DEVICES.
(Application filed Feb. 5, 1902.)
(No Model.)
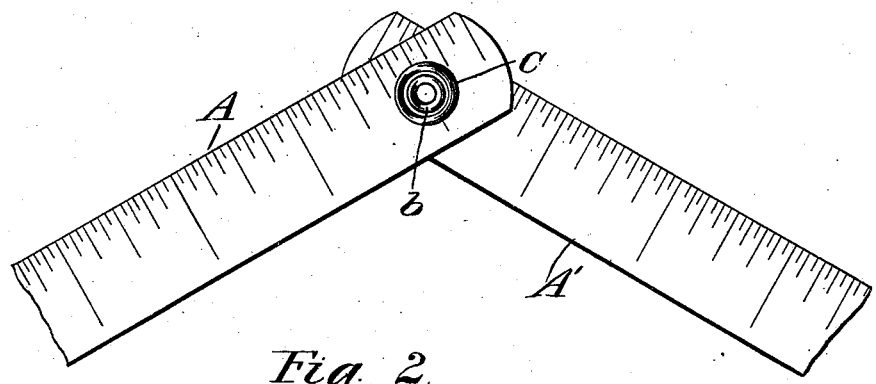
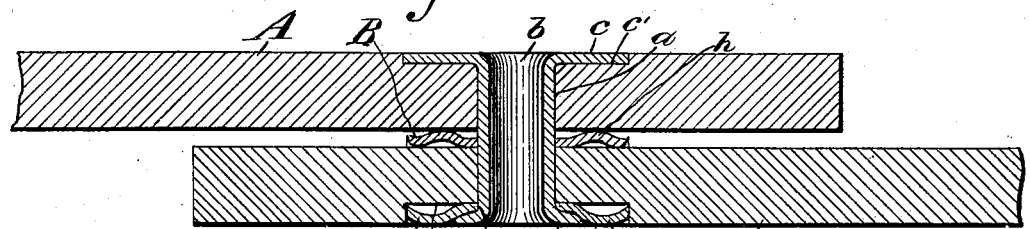
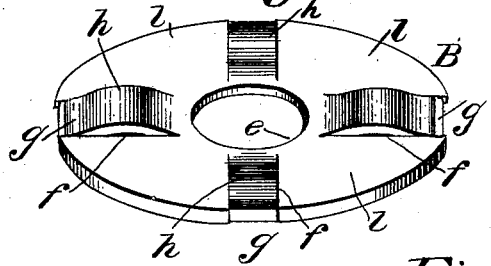
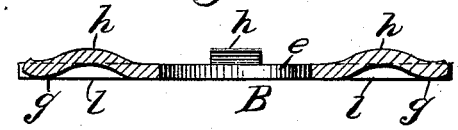
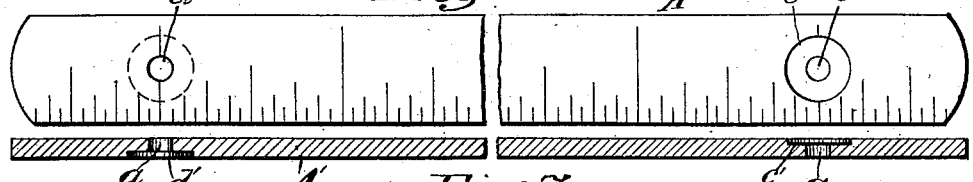
Witnesses:
J. E. Davidson.
F. E. Maynard.
Inventor:
Frank L. Traut.
By his Attorney.
F. H. Richards.

UNITED STATES PATENT OFFICE.

FRANK L. TRAUT, OF NEW BRITAIN, CONNECTICUT.

JOINT FOR FOLDABLE RULES OR SIMILAR DEVICES.

SPECIFICATION forming part of Letters Patent No. 713,255, dated November 11, 1902.

Application filed February 5, 1902. Serial No. 92,636. (No model.)

*To all whom it may concern:*

Be it known that I, FRANK L. TRAUT, a citizen of the United States, residing in New Britain, in the county of Hartford and State of Connecticut, have invented certain new and useful Improvements in Joints for Foldable Rules or Similar Devices, of which the following is a specification.

This invention relates to joints for rules and similar foldable devices; and it consists, substantially, in the improvements hereinafter described.

The invention has reference more especially to a joint particularly adapted to that class or type of relatively long foldable rules— such, for instance, as are employed by surveyors and others and which are usually constructed or made up of a considerable number of sections movably joined together to swing or turn upon each other. Rules of this particular character are sometimes denominated in the market as "German" folding rules, because formerly the greater proportion of them sold in this country were imported from Germany.

The object of the present invention is to provide an exceedingly simple and effective joint for rules and similar foldable devices and also to provide a joint which may be readily applied to the sections of the device without alteration of the construction of such sections as now ordinarily made in some instances.

A further object of the present invention is to provide a joint for the sections of rules and similar foldable devices comprising means by which an effective yieldable or elastic pressure is obtained to hold the foldable sections of the device to any position to which they may be turned or carried.

A still further object is to provide a joint for rules and similar foldable devices which is both constant and uniform in its action or working effect over a long period of time and one also comprising comparatively few parts capable of being quickly made or stamped up into shape by the use of simple dies for the purpose.

The invention also has other objects in view, as will hereinafter more fully appear when taken in connection with the means substantially such as I have illustrated in the accompanying drawings, in which—

Figure 1 is a side view of portions of two sections of a foldable rule or similar device movably connected together by a joint the elements of which are constructed and organized in accordance with the present embodiment of my invention. Fig. 2 is an enlarged longitudinal sectional view of portions of two sections of a foldable rule or similar device, also shown as movably joined together or connected at the ends by means of the same embodiment of my invention. Fig. 3 is an enlarged perspective view of the pressure device or friction-plate located intermediate of or between the foldable sections of the rule or other similar device, and Fig. 4 is a sectional detail view thereof. Fig. 5 is an enlarged side view of a rule-section with a portion broken out at the central part thereof and showing the construction of the same at the ends, and Fig. 6 is a longitudinal sectional view thereof. Fig. 7 is a perspective view in detail of the pressure device located at the outer face of one of the rule-sections.

Before proceeding with a more detailed description it may be stated that in carrying my invention into effect, and more especially with reference to the embodiment thereof herein illustrated, I form a rivet-hole at or near each end of each of the overlapping sections of the rule or other similar foldable device, and to movably join or unite the sections together I preferably employ hollow rivets passing through such holes and having the ends thereof headed or upset into countersinks therefor formed around the rivet-holes on the outer faces of the adjoining rule-sections. I employ in connection with each pair of foldable sections and the rivet which unites them specially-constructed coöperating pressure devices, the action of each of which may be said to be the reverse of the other since one of said devices tends to separate or force the ends of the rule-sections apart and the other to draw the sections together, the resultant effect being that the said sections are held together frictionally with a yielding elastic pressure, serving to maintain them in any position to which they may be swung or carried. In applying the several elements of the joint to the rule-sections they are suitably assembled with the fastening-rivet, and the heading or upsetting of the ends of such rivet places the reversely-operating pressure devices under the necessary stress or tension to constantly and uniformly operate in the performance of their respective functions. One of said pressure devices is confined or located between the rule-sections at the overlapping ends thereof, while the other is located within the countersink in one of said sections and coöperatively organized with the rivet-head at that side, as hereinafter explained, it being understood that the rivet itself plays an important part in my improved joint, particularly in its relations with the reversely-operating pressure devices.

Specific reference being had to the accompanying drawings by the designating characters marked thereon, A A' each represents a section of a rule or similar foldable device, the two lapping each other at the ends for a suitable distance, as indicated in Figs 1 and 2, and each being formed with a hole or opening $a$ for the insertion or passage therethrough of the rivet $b$, which holds the said sections together. I preferably employ a rivet that is hollow, the ends thereof being headed or upset at $c$ and $d$, respectively, and which heads are received in the countersinks $c'$ and $d'$ formed therefor in the outer faces of the upper and lower rule-sections, respectively. The head $c$ of the rivet completely fills the countersink $c'$ and is flush with the outer surface of the upper rule-section A, while the head $d$ is of smaller diameter and does not fill its countersink, though it is practically flush with the outer surface of lower rule-section A'. Said head $d$ is so acted upon by one of the reversely-operating pressure devices herein employed as to constantly tend to draw the rule-section A toward the section A'. The said pressure devices may be constructed and organized in various different ways and still be within the scope and spirit of my invention; but preferably in the embodiment which I have herein employed to illustrate my invention the said devices each comprises practically an elastic friction plate or washer of special construction and each also being specially organized with reference to the rule-sections and rivet with which it coöperates. Thus in the form herein shown B (see Fig. 3) represents one of my specially-constructed pressure devices comprising a spring-plate which is formed with a central opening $e$ of diameter to enable the said plate to be passed onto the rivet $b$, so as to occupy a position intermediate or between the rule-sections, substantially as indicated in Fig. 2, and said plate is also slit or cut at $ff$ from the edge thereof and preferably on four sides at diametrically opposite points, by which to form relatively narrow spring or elastic sections $g$, which are bent upwardly to form humps or shoulders $h$, which in practice and especially when the rule-sections are not very hard (rules of this kind being usually made of wood) become partially indented in the inner surface of the rule-section A and prevent the spring-plate B from turning with respect to said rule-section. Thus each of the said spring-sections $g$ of said plate has an elastic bearing on the inner face of rule-section A, as well as upon or against the adjacent or inner face of the rule-section A', it being understood that the flat intermediate divisions $l$ of the plate are also seated upon the inner or upper face of rule-section A'. This description of the spring-plate or pressure device B of course only applies thereto in its coöperative relation with the remaining parts or elements of my improved rule-joint, and it is apparent that when the spring or elastic sections $g$ become engaged with one of the rule-sections in the manner described the spring-plate or pressure device B is caused to turn upon or against the adjacent face of the other rule-section, and the side of said plate or pressure device opposite to that on which the spring or elastic sections $g$ may be said to be located thus becomes a friction-surface. It should be remarked that some part of one or another of the humps of plate B always bears on some part of the adjacent surface of rule-section A irrespective of the position to which such sections may be turned. Also coöperatively assembled or organized with the head $d$ of the said rivet $b$ is the other pressure device C employed herein as an element of my improved rule-joint, said device being constituted of a plate having a central opening $m$ for receiving the rivet $b$ and also being of reversely-curved formation or construction all around transversely between its outer edge and the edge of the opening therein, substantially as shown in Fig. 2. Said plate is held to its seat within the countersink $d'$ in the outer face of rule-section A' by means of the head $d$ of the rivet engaging the outer face of the plate all around at the inner edge thereof, the outermost part of the surface of said plate being about flush or even with the said outer face of said rule-section A'. This plate C is substantially (though not necessarily) of the character of a spring-washer in the respect that the upsetting of the head $d$ of the rivet thereagainst forces or draws the central portion thereof toward and in contact with the base of the countersink in rule-section A', the said central portion being thus deflected relatively to the outer inturned portion $s$ of the plate, this latter portion being thereby brought to bear more firmly with an elastic pressure upon its part or portion of the seat for the plate in the countersink $d'$. The said inturned portion $s$ has a bearing against the side of the countersink in which the plate is confined, and thus said plate is rendered effective in the performance of the function ascribed to it. By means of the construction and organization explained the pressure device or plate C is placed under tension, and it acts to pull down upon the rivet b in such manner as to tend to carry rule-section A toward the section A', said tendency, however, being met by the opposite or counter tendency of the pressure device B between the rule-sections. The direct effect of the said plate or pressure device C is to draw the rule-sections together and to make such sections bear more firmly upon the intermediate plate or pressure device B, the result being that said device B is rendered effective and is maintained constantly in condition for uniformity of action over a long period of time, which result is particularly important in all kinds of pocket-rules.

It will of course be understood that the result as to frictional resistance of my improved joint is due to the coöperation of all the parts or elements, and especially to the conjoint action of the said inner and outer pressure devices, the pressure of the rule-sections upon the inner pressure device being maintained by the elasticity of the outer pressure device tending to draw the rule-sections together, as already explained.

From the foregoing description, taken in connection with the embodiment of my improved rule-joint as herein illustrated, it is thought the nature of my improvements will be fully understood. I desire to add, however, that in practice I may resort to immaterial changes from the particular details of construction and organization herein shown and described without departure from the spirit and scope of my invention.

Having described my invention, I claim—

1. A joint for the sections of foldable rules and similar devices, comprising means tending to force the sections apart in all positions thereof with a constant yielding pressure, and means tending to force the sections together in all positions thereof also with a constant yielding pressure.

2. A joint for the sections of foldable rules and similar devices, comprising means between the sections tending to force the sections apart in all positions thereof with a constant yielding pressure, said means engaging the inner face of one section and having movable bearing on the adjacent face of the other section, and means within the plane of the outer face of one of the sections tending to force the sections together in all positions thereof also with a constant yielding pressure.

3. A joint for the sections of foldable rules and similar devices, comprising means tending to force the sections apart with a yielding elastic pressure, and means tending to draw said sections together also with a yielding elastic pressure.

4. A joint for the sections of foldable rules and similar devices, comprising means tending to force the sections apart with a yielding elastic pressure, said means engaging the inner face of one section and having movable bearing on the adjacent face of the other section, and means within the plane of the outer face of one section tending to draw said sections together also with a yielding elastic pressure.

5. A joint for the sections of foldable rules and similar devices, comprising means between the sections tending to force them apart in all positions thereof with a constant yielding pressure, and means within the plane of the outer face of one of the sections tending to force them together in all positions thereof also with a constant yielding pressure, the means first named being rendered effective by those last named.

6. A joint for the sections of foldable rules and similar devices, comprising means tending to force said sections apart in all positions thereof with a constant yielding pressure, said means engaging the inner face of one section and having movable bearing on the adjacent face of the other section, and means tending to force said sections together in all positions thereof also with a constant yielding pressure, the means first named being rendered effective by those last named.

7. A joint for the sections of foldable rules and similar devices, comprising means tending to separate the sections with a yielding elastic pressure, said means engaging the inner face of one of the sections and having movable bearing on the adjacent face of the other section, and means tending to draw said sections together also with a yielding elastic pressure, the means first named being rendered effective by those last named.

8. A joint for the sections of foldable rules and similar devices, comprising a rivet passing through the sections, means fitting upon the rivet tending to force the sections apart in all positions thereof with a constant yielding pressure, and means also fitting upon the rivet tending to draw the sections together in all positions thereof also with a constant yielding pressure, said latter means being within the plane of the outer face of one of the sections.

9. A joint for the sections of foldable rules and similar devices, comprising a rivet passing through the sections, means fitting the rivet between the sections and tending to force the latter apart in all positions thereof with a constant yielding pressure, said means engaging the inner face of one section and having movable bearing on the adjacent face of the other section, and means also fitting said rivet at the outer face of one of the sections tending to draw said sections together also in all positions thereof and with a constant yielding pressure.

10. A joint for the sections of foldable rules and similar devices, comprising a rivet passing through the sections, means tending to separate the sections in all positions thereof with a constant yielding pressure, and means coöperating with one of the rivet-heads to draw said sections together also in all positions thereof and with a constant yielding pressure, said latter means being within the plane of the outer face of one of the sections.

11. A joint for the sections of foldable rules and similar devices, comprising a rivet passing through the sections, means fitting the rivet between the sections tending to force the latter apart in all positions thereof with a constant yielding pressure, said means engaging the inner face of one section and having movable bearing on the adjacent face of the other section, and means coöperating with one of the rivet-heads to draw said sections together also in all positions thereof and with a constant yielding pressure.

12. A joint for the sections of foldable rules and similar devices, comprising a rivet passing through the sections, means fitting the rivet between the sections tending to force the latter apart in all positions thereof with a constant yielding elastic pressure, and means within the plane of the outer face of one of the sections coöperating with one of the rivet-heads to draw the sections together also in all positions thereof with a constant yielding pressure.

13. A joint for the sections of foldable rules and similar devices, comprising a rivet passing through the sections, means fitting the rivet between the sections tending to force the latter apart with a yielding elastic pressure in all positions thereof, said means engaging the inner face of one section and having movable bearing on the adjacent face of the other section, and means within the plane of the outer face of one of the sections also fitting the rivet and coöperating with one of the heads of the rivet to draw the sections together also with a yielding elastic pressure.

14. A joint for the sections of foldable rules and similar devices, comprising a rivet passing through the sections, a spring-plate intermediate the sections tending to force them apart, said plate constructed to engage the inner face of one section and having movable bearing on the adjacent face of the other section, and a spring-washer at the outer face of one of the sections tending to draw said sections together.

15. A joint for the sections of foldable rules and similar devices, comprising a rivet passing through the sections, a spring-plate intermediate the sections tending to force them apart, and a spring-washer engaged by one of the rivet-heads and coöperating with said head to draw the sections together, said washer and rivet-head being within the plane of the outer face of one of the sections.

16. A joint for the sections of foldable rules and similar devices, comprising a rivet passing through the rule-sections, a plate intermediate the latter having movable bearing on the inner face of one rule-section and also having spring-sections formed with humps engaging the adjacent face of the other rule-section, said spring-sections tending to force the rule-sections apart, and means tending to draw said rule-sections together.

17. A joint for the sections of foldable rules and similar devices, comprising a rivet passing through the rule-sections, a plate intermediate the latter having movable bearing on the inner face of one rule-section and having spring-sections formed with humps engaging the adjacent face of the other rule-section, said spring-sections tending to force the rule-sections apart, and means within the plane of the outer face of one of the rule-sections coöperating with one of the rivet-heads tending to draw said rule-sections together.

18. A joint for the sections of foldable rules and similar devices, comprising a rivet passing through the rule-sections, a plate intermediate the latter having movable bearing on the inner face of one rule-section and also having spring-sections formed with humps engaging the inner face of the other rule-section, said spring-sections tending to separate the rule-sections, and a spring-washer within the plane of the outer face of one of the rule-sections coöperating with one of the rivet-heads to draw said rule-sections together.

FRANK L. TRAUT.

Witnesses:
JUSTUS A. TRAUT,
EBEN STRONG.